United States Patent [19]

Kinzenbaw

[11] Patent Number: 4,738,315
[45] Date of Patent: Apr. 19, 1988

[54] HYDRAULIC CONTROL APPARATUS INCLUDING MASTER CYLINDER WITH MULTIPLE LIMIT POSITIONS

[76] Inventor: Jon E. Kinzenbaw, R.R. 1, Box 184, Williamsburg, Iowa 52368

[21] Appl. No.: 910,370

[22] Filed: Sep. 22, 1986

Related U.S. Application Data

[63] Continuation-in-part of Ser. No. 779,164, Sep. 23, 1985.

[51] Int. Cl.⁴ .............................................. A01B 63/14
[52] U.S. Cl. ..................................... 172/310; 60/581; 91/520; 172/413
[58] Field of Search .............. 172/294, 310, 311, 328, 172/400, 401, 413, 421; 60/545, 574, 581, 567; 91/520, 527, 531, 535, 536

[56] References Cited

U.S. PATENT DOCUMENTS

| | | | |
|---|---|---|---|
| 2,830,519 | 4/1958 | Chandler et al. | 172/294 X |
| 3,774,696 | 11/1973 | Horsch | 91/520 X |
| 3,871,266 | 3/1975 | Schwab et al. | 91/536 X |
| 4,151,886 | 5/1979 | Boetto et al. | 172/311 |
| 4,427,207 | 1/1984 | Gafford | 172/401 X |
| 4,641,388 | 2/1987 | Bennett et al. | 172/520 X |

FOREIGN PATENT DOCUMENTS 2537003 10/1976 Fed. Rep. of Germany ........ 91/536

Primary Examiner—Richard T. Stouffer
Attorney, Agent, or Firm—Emrich & Dithmar

[57] ABSTRACT

An hydraulic circuit includes a master cylinder and at least one slave cylinder connected in series circuit. An auxiliary discharge conduit with a solenoid-actuated valve is provided to selectively permit the master cylinder to extend its full useful range after the slave cylinders are fully extended. Under normal operation the valve is closed so that the cylinders may extend together. When the slave cylinders reach full extension, the main control valve is kicked out of its detent and the system locks up in that position. If the operator wants the master cylinder to extend further to a second limit position, he opens the solenoid-actuated valve and again operates the main control valve to extend the master cylinder. The system insures that the main control valve will be released from the detent position when the slave cylinder is fully extended at the first limit position of the master cylinder.

5 Claims, 3 Drawing Sheets

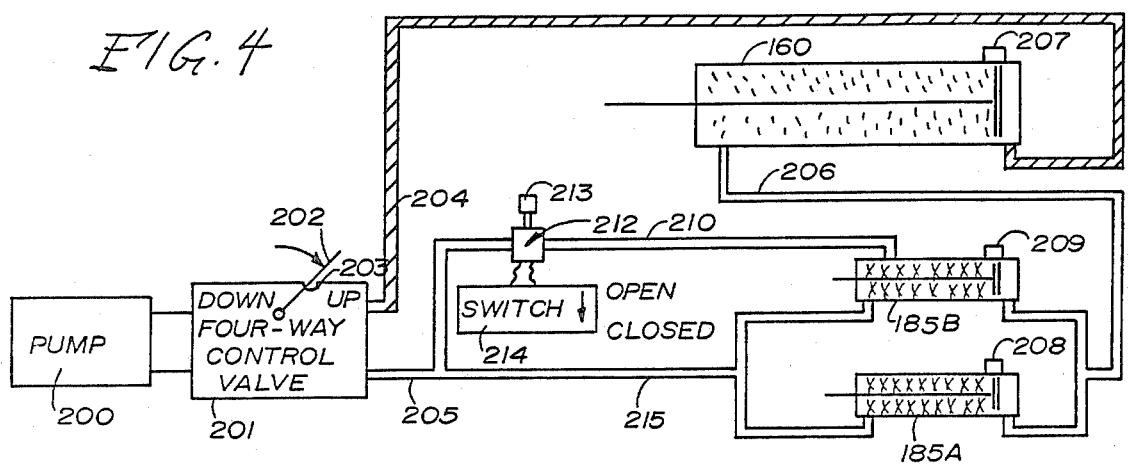
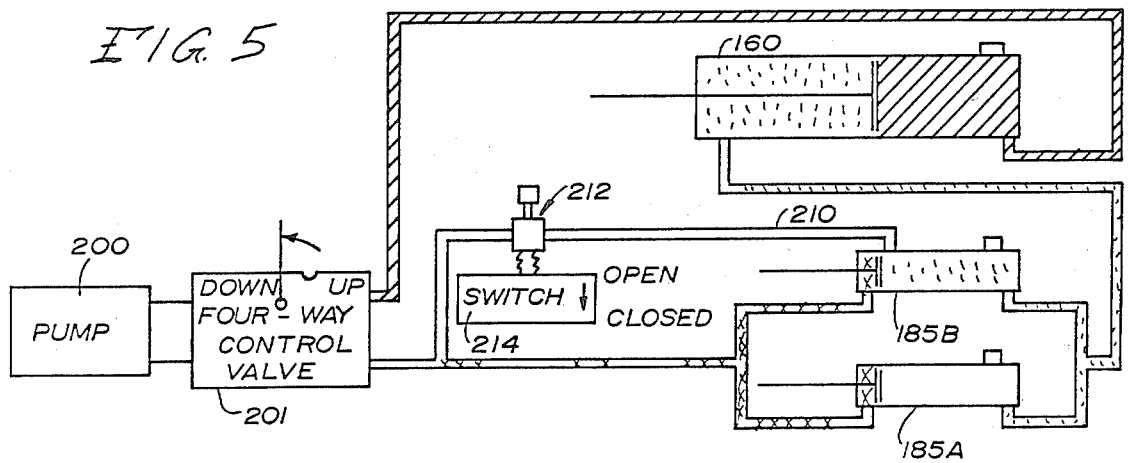
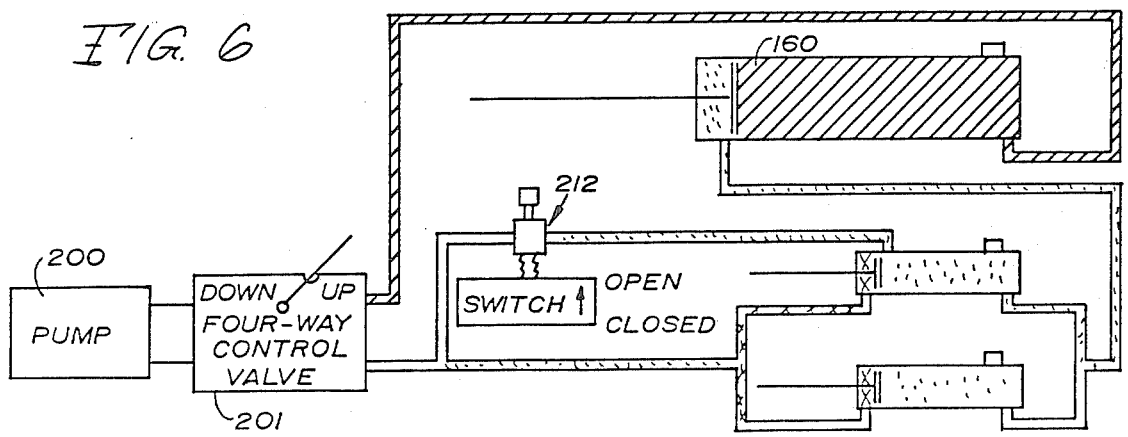

HYDRAULIC CONTROL APPARATUS INCLUDING MASTER CYLINDER WITH MULTIPLE LIMIT POSITIONS

RELATED APPLICATION

This is a continuation-in-part application of my co-pending application for U.S. Letters Patent, Ser. No. 779,164, filed Sept. 23, 1985, entitled "Agricultural Planter".

FIELD OF THE INVENTION

The present invention relates to control circuits for hydraulic cylinders; and it has particular application in hydraulic circuits having a master cylinder and one or more slave cylinders wherein the master cylinder may be extended to additional limit positions after the slave cylinder is fully extended.

BACKGROUND AND SUMMARY OF THE INVENTION

By way of example, an hydraulic circuit of the type with which the present invention is concerned is used in the agricultural planter disclosed in my co-pending application entitled "Agricultural Planter", U.S. Ser. No. 779,164. The planter disclosed in that application is a large agricultural planter having a lift frame which may be elevated relative to a carrier frame to two different positions of elevation. In the first or lower elevated position, the lift frame raises the individual planter units out of the planting position so that the planter may turn at the end of a field. This first height for the lift frame not only removes the individual planter row units from engagement with the ground, but it disengages the drive system for the seed meters. Otherwise, the meters would continue to meter out the seed, fertilizer and insecticide.

The hydraulic circuit for raising the lift frame to this first position includes a master cylinder cooperating with at least one slave cylinder. Actually, there are two such hydraulic circuits in the planter, one on the right side and one on the left side, but they are similar in structure and they function together.

When the hydraulic cylinders elevate the lift frame to the end turn position, the slave cylinders have reached full extension, but the master cylinder has not. The master cylinder may be further extended to elevate the entire lift frame (in which case, the wings of the lift frame are locked to the center section, and the master cylinder is further extended) to a second, higher position. At the second limit position of the master cylinder, the entire lift frame may be rotated 90° about a vertical axis so that it extends parallel to the direction of travel of the tractor for road transport.

It will thus be apparent that the farmer raises the planter to the first limit position of the master cylinder (i.e., for an end turn) many more times than he raises the master cylinder to its second limit position for road transport.

A conventional type of hydraulic control valve in the tractor (sometimes called the "main valve" or "selective control valve") used by the farmer for these control functions has a mechanical detent for maintaining the operating lever in the "up" position, until a sharp increase in pressure, as occurs when the slave cylinders reach the limits of their extension, is sensed by the control valve to kick the lever out of the detent position and lock up the hydraulic system at that time. However, for a number of reasons, and for certain types of hydraulic systems, depending upon the manufacturer of the tractor, for example, operation of the hydraulic system has not reliably disengaged the operating lever from the detent at the first limit position for end turns. If disengagement of the control valve at the first limit position does not occur reliably, the operator must continually direct his attention to the planter to ensure that it does not elevate to the road transport position. Thus, it is important to actuate the selective control valve and release it from detent in a reliable manner when the master cylinder has reached its first limit position; and the present invention has, as a principal objective, that purpose.

The present invention provides a separate auxiliary discharge conduit with a solenoid-actuated control valve having a normally closed position. The auxiliary discharge conduit is located in the hydraulic circuit so as to permit the master cylinder to extend from its first limit position to its second limit position only when the solenoid valve is opened. Thus, when the main control valve is placed in detent the first time, the master and slave cylinders extend until the slave cylinders are fully extended. Conventional rephasing ports at the rod end of the slave cylinders are eliminated, so that when the slave cylinders are fully extended, and the auxiliary discharge conduit is closed, pressure increases rapidly and the resulting pressure "spike" releases the main control valve from its detent position. This, of course, disconnects the hydraulic pump from the cylinders and locks the hydraulic cylinders in place.

If the operator wants the master cylinder to extend from its first limit position to a second limit position, he opens the solenoid-actuated valve and again operates the main control valve to extend the master cylinder. During this operation, the slave cylinders remain fully extended, and hydraulic fluid is discharged from the rod end of the master cylinder through the auxiliary discharge conduit because the solenoid-actuated valve is open; and the hydraulic fluid returns to the hydraulic reservoir or the return port of the pump.

Thus, the system insures that the selective control valve on the tractor will be released from detent when the slave cylinders are fully extended at the first limit position of the master cylinder so that the operator need not be concerned when he raises the planter for an end turn. Yet the master cylinder can be extended even further to a second limit position when desired to elevate the lift frame to the transport position.

Other features and advantages of the present invention will be apparent to persons skilled in the art from the following detailed description of a preferred embodiment accompanied by the attached drawing wherein like reference numerals will refer to similar elements in the various views.

BRIEF DESCRIPTION OF THE DRAWING

FIG. 4 is an hydraulic schematic circuit diagram for the control system for raising the lift frame;

FIG. 5 is a view of the hydraulic control system with the master cylinder in the first limit position; and FIG. 6 is a diagram of a hydraulic control system with the master cylinder in the second limit position.

DETAILED DESCRIPTION OF THE ILLUSTRATED EMBODIMENT

To facilitate an explanation and understanding, the invention will be illustrated in combination with an agricultural planter, but the particular planter shown is not a necessary part of the invention since the invention could be used with other agricultural implements and is not even limited to agricultural applications, as persons skilled in the art will appreciate from a complete understanding of the invention.

Figure 1:
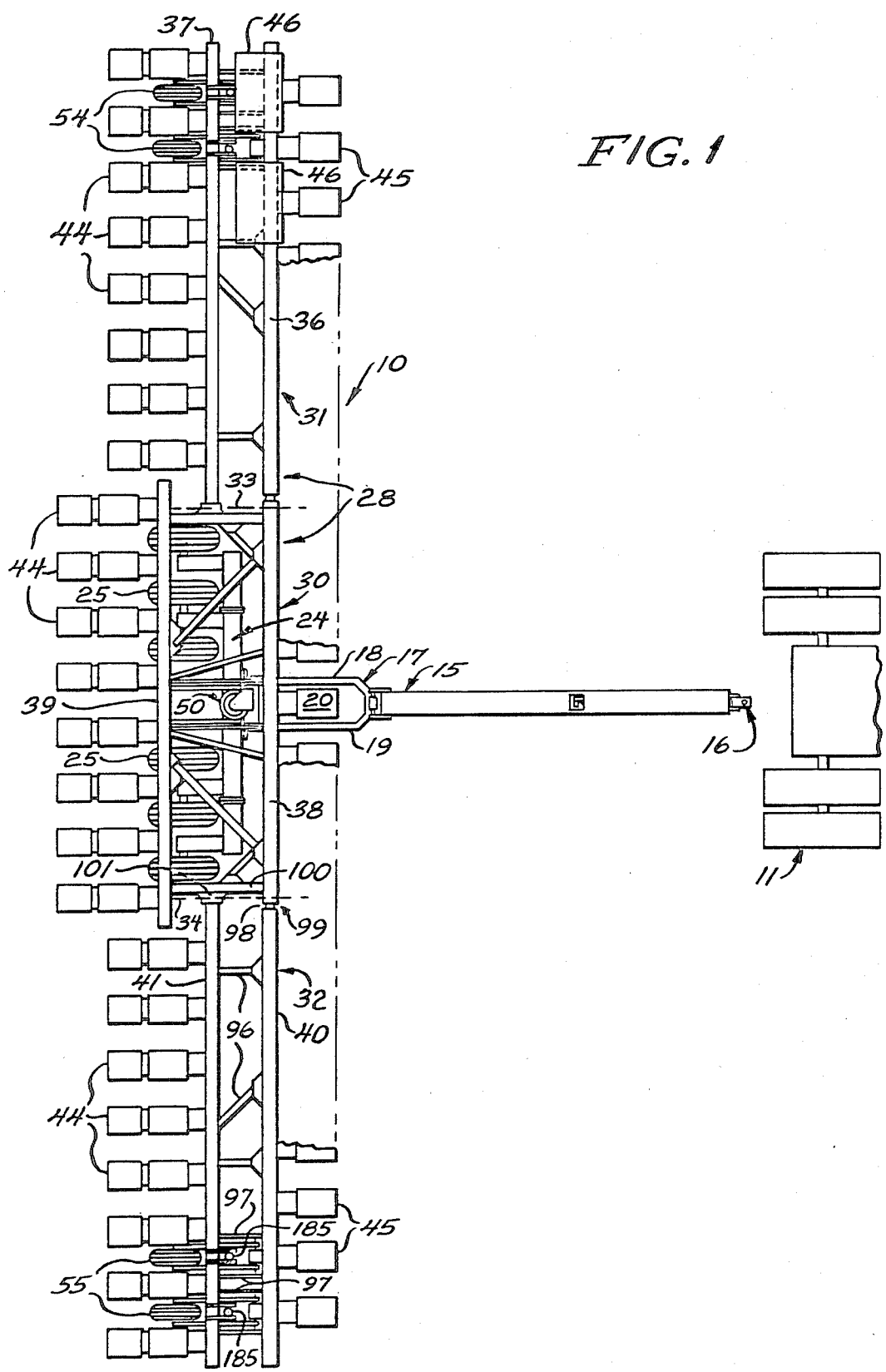
FIG. 1 is a plan view of an agricultural planter in which the present invention is exemplified, with some of the elements removed for clarity.

Referring to FIG. 1, the present invention is illustrated in the context of a planter generally designated by reference numeral 10 and adapted to be pulled by a large agricultural tractor, the rear portion of which is schematically illustrated at 11. The planter 10 includes a telescoping tongue 15 which includes, at its forward end, a clevis 16 for attaching to the tractor hitch.

The rear of the tongue 15 includes a bifurcated section generally designated 17 and which includes left and right side members 18, 19 which are spaced apart to permit a forward, central row unit 20 to be located on the center line of the apparatus, as will become apparent.

The rear of the bifurcated tongue section 17 is rigidly attached to a main carrier frame 24. In the illustrated embodiment, the carrier frame 24 is provided with support wheels 25, and the carrier frame 24 does not elevate relative to its associated support wheels 25.

Supported on the carrier frame 24 is a planter lift frame generally designated 28. The lift frame 28 of the illustrated embodiment includes three sections: A center section generally designated 30, and left and right wing sections designated respectively 31 and 32. The left frame section 31 is attached to the left side of the center frame section 30 for vertical pivotal movement about a horizontal axis designated 33. Similarly, the right lift frame section 32 is mounted to the right side of the center frame section 30 for pivotal motion about a horizontal axis 34.

Left and right wing lock mechanisms are included for locking the left frame section 31 (sometimes referred to as a "wing" or "wing frame") and the right frame section 32 to the center frame section 30 to preclude downward motion about the axes 33, 34 when it is desired to raise the entire lift frame (which includes both wings) for transport.

Each of the lift frame sections has a forward mounting bar and a rear mounting bar (although a single mounting bar is possible and may be preferred) which are connected together by transverse frame members to form a rigid section frame. Thus, the left frame section 31 includes a forward mounting bar 36 and a rear mounting bar 37. The forward and rear mounting bars for the center frame section 30 are designated 38 and 39 respectively; and the corresponding forward and rear mounting bars for the right frame section 32 are designated 40 and 41 respectively.

A set of 24 conventional planter row units designated 44 are mounted to the rear mounting bars of the frame sections. That is, eight row units each are mounted to the rear mounting bars 37, 39 and 41. Similarly, eight pusher-type row units designated 45 are mounted to each of the forward mounting bars 36 and 40 of the wings, and seven pusher row units 45, including the center row unit 20 are mounted to the forward mounting bar 38 of the central section 30 of the lift frame. Some of the forward units have been removed for clarity.

As best seen in the upper portion of FIG. 1, a plurality of storage hoppers 46 for dry fertilizer are also mounted on the forward mounting bars 36, 38 and 40 (although only the two on the left side are seen in FIG. 1 for clarity). Fertilizer attachments (including openers and distribution conduits) are provided for distributing particulate fertilizer stored in the hoppers 46 when it is desired to plant corn.

Although the invention is illustrated in the form of a row crop planter with individual row units, many aspects of the invention are equally well suited to other large implements, particularly winged implements, as persons skilled in the art will readily appreciate.

Figure 2:
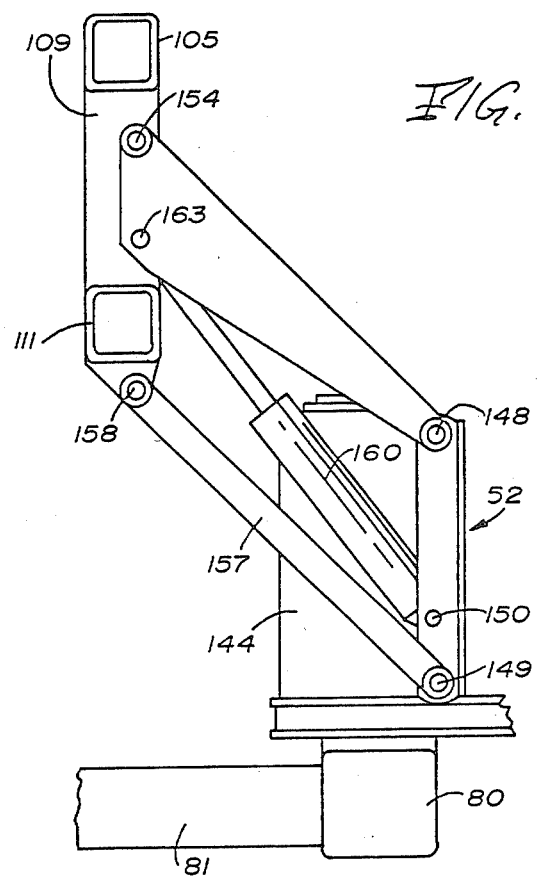
FIG. 2 is a right side close-up view of the master cylinder and linkage for raising the lift frame of the planter of FIG. 1.
Figure 3:
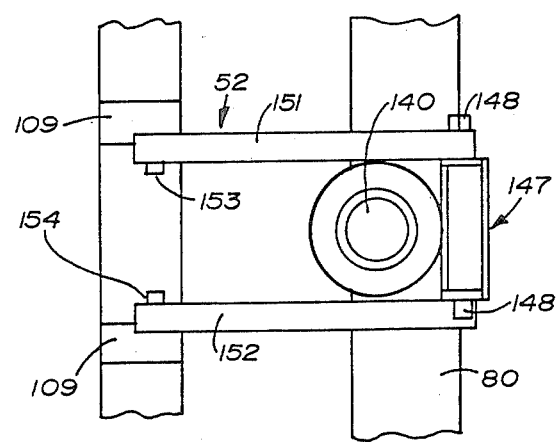
FIG. 3 is a broken away plan view of the elevating mechanism of FIG. 2.

The lift frame 28 is connected to the carrier frame 24 by means of a pivot post assembly generally designated 50 in FIG. 1 and an hydraulically powered lift linkage mechanism generally designated 52 and seen in more detail in FIGS. 2-3.

The outboard end of the left lift frame section 31 is supported by wing support wheels 54 in the planting position and the intermediate raised position for end turns. The outboard end of the right lift frame section 32 is similarly supported by wing support wheels 55. Although two wing support wheels are seen on each wing end, one, two or three may be used, depending on the size of the planter.

The right wing frame 32 is made rigid by struts 96 welded between the forward and rear frame bars 40, 41, as well as by plates 97 welded between the mounting bars at the outboard ends thereof. The forward mounting bar 32 has a reduced extension 98 which is journalled on a pin secured at 99 in the forward mounting bar 38 of the center frame section 30. The inboard end of the rear mounting bar 41 is secured to a transverse frame member 100 by pivot connection 101. The left wing frame is similarly constructed and mounted to the center frame section.

The planter system as seen in FIG. 1 is set in the planting or use configuration. The tongue 15 is retracted to minimize the distance between the rear wheels of the tractor and the planter to facilitate turns at the end of a swath traversed by the planter. In the use position as well as when making end turns, the wing locks 35 are unlocked, permitting the left and right wing sections to pivot freely relative to the center frame section 30 to follow uneven ground contours. The entire lift frame 28, of course, is lowered, the wing support wheels 54, 55 are actuated by their associated hydraulic cylinders to positions between adjacent row units and immediately adjacent those units in the use position. The lower limit of the center frame section 30 is determined by the lower limit of the lift linkage assembly 52, to be described in more detail below. Thus, each of the individual row units 44, 45 is free to move up and down as required by the ground contour for accurate planting depth.

The lateral spacing of the rear row units 44 is set at the desired row spacing for corn (typically, 30 in. on center between adjacent row units). When corn is planted, the forward row units 45 may be locked in a raised position, and fertilizer from the storage hoppers 46 is distributed adjacent each of the seed furrows when planting corn. The forward row units 45 need not be removed from the planter even though corn is being planted.

When it is desired to plant beans, fertilizer normally is not deposited, so the fertilizer attachments 47 are closed off and raised. The forward row units 45 are mounted such that their center lines fall midway between the center lines of adjacent rear row units 44.

Thus, the forward row units 45 are sometimes referred to as "interplant" units. If both the forward and rear row units are employed, the resulting rows will be planted on a 15 in. spacing.

When it is desired to raise the row units out of ground engagement for an end turn, the lift linkage assembly 52 is actuated by a master cylinder 160 (FIG. 2) to an intermediate height, and the left and right frame sections 31, 32 are also elevated by slave cylinders 185 relative to their associated support wheels 54, 55 so that all of the row units are raised above planting position and the drive systems are disengaged. The lift linkage assembly and its associated actuating mechanism will be further described within, and it will then be understood that the lift linkage assembly 52 may be raised to a height above this intermediate position to a second height for road transport.

When it is desired to put the planter in a transport configuration, the telescoping tongue 15 is extended and the wing locks 35 are actuated to cause the wing sections to be secured to the center frame section so they cannot rotate downward, and the lift linkage assembly 52 is actuated to its full height. This elevates the center frame section 30 and both wing frame sections 31, 32 as well as their associated support wheels 54, 55 above the ground so that the row units and wing support wheels are elevated above the carrier frame and tongue. Next, the lift frame is rotated counterclockwise about pivot post assembly 50 (when viewed from the top) approximately a quarter turn wherein the lift frame is elongated parallel to the direction of travel of the tractor, thereby providing a minimum width for road travel. The rotation of the lift frame about the pivot post assembly 50 is effected by an hydraulically powered swing linkage assembly (not shown); and the end of the right frame section 32 is locked in the transport position by a transport latch assembly mounted to the tongue 15.

Turning now to FIGS. 2-3, the pivot post assembly 50 and hydraulically powered lift linkage assembly 52 will be described. The pivot post assembly 50 includes a rigid center post 140 which is rigidly secured to the transverse tubular frame member 80 of the carrier frame 24. The post 140 defines a vertical axis about which the lift frame rotates, but the post itself does not rotate.

A sleeve or bell housing 144 is rotatably mounted on the post 140 by means of upper and lower tapered roller bearings to permit carrying a vertical load as well as to resist side thrust. The bell housing 144 is provided with a forward bracket 147 in which three transverse pivot pins 148, 149 and 150 are mounted.

Lift linkage 52 includes left and right upper links 151, 152 which have their forward ends journalled to the upper pivot pin 148 and their rear ends journalled on a pivot pins 153, 154 mounted respectively to the two center struts 109 of the arched rear mounting bar of the center section frame.

The lift linkage 52 also includes a pair of lower links, one of which is designated 157, which have their forward ends journalled on the lower pivot pin 149 mounted in the bracket 147 and their rear ends journalled on a pivot pin 158 which is mounted beneath the previously described horizontal mounting section 111 of the arched rear mounting bar.

A pair of hydraulic cylinders, the right side cylinder being seen and designated 160, have their butt ends pivotally mounted on pin 150 and their rod ends journalled on pin 163 which is mounted in upper link 152.

When the cylinders 160 are retracted, the lift linkage 52 is rotated counterclockwise to the lowered position (when viewed from the right). When the cylinders are extended, the linkage is rotated clockwise to raise the lift frame as seen in FIG. 2.

Each of the main lift cylinders are master cylinders. The slave cylinders associated with master cylinders are located to raise the left and right wing frames 31, 32 relative to the wing support tires 54. The master cylinder on the right is seen at 160 in FIGS. 2 and 3; and it is connected in circuit with the lift cylinders for the right wing section.

The extension of the master cylinders is approximately twice the extension limit of the slave cylinders so that when the slave cylinders are fully extended (thereby raising the wings and associated row units above the ground for an end turn), the master cylinders are extended to an intermediate or first limit position but are not fully extended.

As the master cylinders raise the center frame section, the slave cylinders raise the outboard ends of the wing frames at the same rate. To accomplish this, the slave cylinders are sized relative to their associated master cylinders such that the oil pumped from the rod end of one of the master cylinders as it extends is fed to the butt end of both associated slave cylinders, and causes them to extend substantially in unison at the same rate as the master cylinder. The force of the master cylinders and the action of the lift linkage 52 causes the center frame section to raise in unison with the wing sections. The slave cylinders associated with a given master cylinder are connected in parallel with one another. Since the hydraulic circuit for each side (i.e., a master cylinder and its associated slave cylinders) is the same, only the right side hydraulic lift system need be described further.

Turning then to FIG. 4, there is shown in schematic form the hydraulic circuit for the right side of the planter. Reference numeral 200 designates the hydraulic pump on the tractor, and the operator main control valve is designated 201. It includes a control lever 202 and a detent position diagrammatically illustrated at 203. The control valve 201 is a four-way or reversible selective control valve which permits the high pressure outlet of the pump 202 to be selectively coupled either to a first hydraulic conduit 204 or a second hydraulic conduit 205 while connecting the complementary conduit to the pump return (i.e., hydraulic reservoir) for raising and lowering the lift frame. All master and slave hydraulic cylinders are, of course, double-acting cylinders. The conduit 204 is coupled to the piston end of the master hydraulic cylinder 160. The conduit 205 is coupled in circuit with the rod ends of the slave hydraulic cylinders, two of which are shown and designated respectively 185A and 185B. Although two slave cylinders are illustrated, the system will work equally well with one slave cylinder or three or more slave cylinders in parallel.

The rod end of the master cylinder 160 is coupled by means of a conduit 206 to the piston end of both slave hydraulic cylinders. The master cylinder 160 is also provided with a rephasing port 207, and the slave cylinders are provided with similar rephasing ports designated 208 and 209, respectively. All rephasing ports are located to permit hydraulic fluid to bypass the piston when the piston is at the fully retracted (i.e., down) position.

An auxiliary discharge conduit designated 210 has one end coupled adjacent the rod end of slave hydraulic cylinder 185B, but as can be seen in FIG. 5, that location is at a position which is on the high pressure side of the piston of the cylinder 185B when that cylinder is fully extended. Persons skilled in the art will appreciate that the auxiliary discharge conduit 210 may be located on the other slave cylinder 185A or in the conduit 206 or at the rod end of the master cylinder 160, as long as it permits hydraulic fluid to evacuate from the rod end of the master cylinder when the master cylinder is being extended from its first limit to its second limit position, as will be understood from further description.

A solenoid-actuated valve generally designated 212 is located in the auxiliary discharge conduit 210, the solenoid actuator being diagrammatically illustrated at 213 and connected by electrical wires to a switch 214 which is preferably located at the operator's position on the tractor. The discharge conduit 210 then communicates with a conduit 215 which is the normal discharge conduit coupled to the rod ends of the slave cylinders, and the conduits 210 and 215 are then in fluid communication with the conduit 205 connected to one of the ports of the main hydraulic control valve 201.

The operation of the hydraulic system will now be described. As seen in FIG. 4, the master and slave cylinders are fully retracted. In this position, the center section and the wing sections of the lift frame are lowered so that the planter row units are in the use or planting position. When it is desired to raise the lift frame to the intermediate position for an end turn, the operator actuates the control lever 202 to engage the detent 203 which temporarily secures the control lever in that position. Pressurized hydraulic fluid is communicated from the pump 200 to conduit 204 to extend the master cylinder 160. Hydraulic fluid from the rod end of the master cylinder is fed to the piston end of the slave cylinders 185A, 185B, so that the master and slave cylinders extend in unison, elevating the lift frame uniformly. Hydraulic fluid from the rod ends of the slave cylinders is discharged through conduit 215 to the return input of the pump through the four-way main control valve 201. The solenoid-actuated valve 212 is normally closed, so no hydraulic fluid flows through the conduit 210.

Referring now to FIG. 5, when the master cylinder reaches a first limit position (which may be any intermediate position between the fully retracted and fully extended positions), and the slave hydraulic cylinders are fully extended (representing elevation of the lift frame for an end turn), hydraulic fluid can no longer flow from the rod ends of the slave cylinder, nor anywhere else, so the master cylinder also is prevented from further movement, and the hydraulic pressure on the piston end of the master cylinder increases rapidly, thereby releasing the main control valve 201 from the detent position back to the neutral or "off" position. This locks the system with the master cylinder at its first limit position, as seen in FIG. 5. The farmer, of course, can reverse the main control valve by operating the lever to the "down" position in which the high pressure side of pump 200 is coupled to conduit 205 and conduit 204 is connected to the return. In this case, the cylinders all retract in unison until the planter is returned to the planting position.

If the farmer wants to raise the lift frame to the transport position from the intermediate position, he actuates switch 214 to open valve 212 and places the main control valve 201 in the "UP" position detent. When valve 212 is open and the slave cylinders are at full extension, as seen in FIG. 6, hydraulic fluid will continue to flow through the auxiliary discharge conduit 210 after the slave cylinders are fully extended so that the master cylinder can continue to extend, thereby raising the lift frame to the transport height, at which the master cylinder is in its second limit position.

Alternatively, the system can be operated directly from the use position to the transport position by opening valve 212 before operating the main control valve. This obviates the operator's having to place the control lever 202 in the "UP" position a second time.

It will also be appreciated that the main valve need not necessarily have a detent, yet the system will prevent inadvertent placement of the lift frame in the transport position. If the detent feature of the main control valve were eliminated, the operator would hold the lever in the "up" position. When the slave cylinders were fully extended, the hydraulic pump would increase pressure and this would result in an audible signal which the farmer could detect, and release the control lever, which would be returned to the neutral position by a spring. The master cylinder could not be further extended until the solenoid valve 214 is opened (which could, of course, be at the beginning of a cycle if the farmer wanted to place the lift frame directly in the transport position from the use position).

Having thus disclosed in detail one embodiment of the invention, persons skilled in the art will appreciate that the invention is not limited to the planter shown and that equivalent elements can be substituted for those disclosed while continuing to practice the principle of the invention. It is therefore intended to cover all modifications, applications and substitutions included in the appended claims.

I claim:

1. Hydraulic control apparatus comprising: a source of pressurized fluid, selective control valve means operable between a closed position and an open position, a master hydraulic cylinder and at least one slave hydraulic cylinder, each of said cylinders having a rod end and a piston end, said cyliners being connected in hydraulic circuit with said selective control valve means such that fluid from the rod end of said master hydraulic cylinder is fed to the piston end of said slave hydraulic cylinder whereby said master and slave hydraulic cylinders are extended together until said slave hydraulic cylinder is fully extended, said master hydraulic cylinder being sized such that when said slave hydraulic cylinder is fully extended, said master hydraulic cylinder is at a first limit position intermediate the fully retracted and fully extended positions of said master hydraulic cylinder auxiliary conduit means including an actuatable second valve means with open and closed conditions, said second valve means in fluid communication with and positioned between said selective control valve means and said master and slave hydraulic cylinders such that when said second valve means is in said closed condition and said selective control valve means is actuated to said open position, pressurized fluid from said source is coupled to said master hydraulic cylinder and said master and slave hydraulic cylinders are caused to extend until said slave hydraulic cylinder is fully extended and said master hydraulic cylinder reaches said first limit position, whereby pressure at said source will increase when said slave cylinder is fully extended and when said second valve means is in said open condition and said selective control valve means is in said open condition, after slave cylinder is fully extended, said master hydraulic cylinder will continue to extend beyond said first limit to a second limit position.

2. The apparatus of claim 1 wherein said selective control valve means has a detent in said open position, said detent being releasable upon fluid pressure increase to release said selective control valve means from said detent.

3. The apparatus of claim 2 wherein said selective control valve means further includes a reverse position and said hydraulic cylinders are double-acting cylinders.

4. The apparatus of claim 3 in combination with an agricultural implement having main frame means adapted to be pulled by a tractor and including a lift frame and ground-engaging units mounted to said lift frame, and further comprising means for mounting said master and slave cylinders between said main frame means and said lift frame to elevate said lift frame relative to said main frame means to a first height when said master hydraulic cylinder is in said first limit position, and to a second height when said second valve means is opened and said master hydraulic cylinder is in said second limit position.

5. The apparatus of claim 2 wherein said auxiliary conduit means is connected to said slave hydraulic cylinder adjacent the rod end thereof and capable of communicating pressurized fluid from said slave hydraulic cylinder after the same is fully extended thereby to permit said master hydraulic cylinder to be extended from said first limit position to said second limit position while said slave hydraulic cylinder remains fully extended.

* * * * *